(12) United States Patent
Reverso

(10) Patent No.: US 6,423,878 B2
(45) Date of Patent: Jul. 23, 2002

(54) PROCESS AND APPARATUS FOR THE CONTROLLED PYROLYSIS OF PLASTIC MATERIALS

(76) Inventor: Riccardo Reverso, Via Mazzoni, 4, 15100 Alessandria (IT)

(*) Notice: Subject to any disclaimer, the term of this patent is extended or adjusted under 35 U.S.C. 154(b) by 0 days.

(21) Appl. No.: 09/923,383

(22) Filed: Aug. 8, 2001

Related U.S. Application Data

(63) Continuation-in-part of application No. 09/267,343, filed on Mar. 15, 1999.

(30) Foreign Application Priority Data

Mar. 20, 1998 (IT) .......................................... MI98A0581

(51) Int. Cl.[7] .............................. C10G 1/10; B09B 3/00; C10B 49/14
(52) U.S. Cl. .......................... 585/241; 201/2.5; 201/25; 202/84; 422/184.1
(58) Field of Search .......................... 585/241; 202/84; 201/2.5, 25; 422/184.1

(56) References Cited

U.S. PATENT DOCUMENTS

| | | | |
|---|---|---|---|
| 3,974,206 A | 8/1976 | Tatsumi et al. | 260/486 R |
| 3,996,022 A | 12/1976 | Larsen et al. | 44/1 D |
| 5,395,405 A | 3/1995 | Nagel et al. | 48/197 R |
| 5,449,438 A | 9/1995 | Jagau et al. | 201/10 |
| 5,543,558 A | 8/1996 | Nagel et al. | 560/214 |
| 5,629,464 A | 5/1997 | Bach et al. | 585/634 |

*Primary Examiner*—Bekir L. Yildirim
(74) *Attorney, Agent, or Firm*—Guido Modiano; Albert Josif; Daniel O'Byrne

(57) ABSTRACT

An apparatus for the pyrolysis (cracking) of a polymeric material consisting of a reactor provided with a molten catalyst bed and a feeding extruder for introducing the polymeric material into the catalyst bed. The process consists in the introduction of a polymeric material in the molten catalyst bed for converting a variety of polymers, side-chain plastics, linear-chain plastics and halogenated plastics, such as for example PVC, into hydrocarbon products which are useful for energy generation while avoiding the pollution problems associated with the direct combustion of plastic materials. The process can also be used for cracking mixtures of polymeric material derived from the sorting of municipal solid waste.

22 Claims, 3 Drawing Sheets

PROCESS AND APPARATUS FOR THE CONTROLLED PYROLYSIS OF PLASTIC MATERIALS

This is a Continuation-In-Part of prior pending Application U.S. Ser. No. 09/267,343 filed on Mar. 15, 1999.

BACKGROUND OF THE INVENTION

The present invention relates to a process and an apparatus for the controlled pyrolysis of plastic materials.

The growing demand for clean energy and the need to dispose waste which degrades naturally only with difficulty, such as plastics from hospital, municipal and industrial waste, is radically changing the problem of disposal, which can no longer be considered as the more or less uncontrolled burial used so far.

On the other hand, thermodestruction technologies are unsuitable and dangerous due to the fumes generated by combustion. Various pyrolysis plants have been started in recent years in an attempt to recover energy-yielding products from plastics; all these plants tend to convert the polymer, by heat emission, into a plurality of products to be used both in combustion to generate electric power and in order to eliminate the acid residues that produce toxic fumes.

The technologies currently used in this field employ high temperatures (500–800° C.) in static and/or rotary furnaces with very long contact times (3–4 min); this entails very high plant costs without an appropriate economic efficiency.

Various disadvantages are observed:

1. direct combustion entails the forming of carcinogenic products, such as dioxins and furfurans;
2. any attempts to directly bum the gasification products instead of the residue of the sorting of municipal solid waste (dry fraction constituted by paper, rags and plastics) does not solve the problem of the emission of the above-mentioned carcinogenic fumes, and gasification contributes to an increase in operating costs;
3. the presence of plastics such as PVC leads to high corrosion of the combustion equipment, and it is impossible to use high-temperature boilers due to he inevitable corrosion of their tube nest.

Thermal cracking and catalytic cracking have long been used in refineries for the pyrolysis of organic components having a medium relative molecular mass. The thermodynamic mechanisms have been described in many documents, including Gates, B. C. et al., *Chemistry of Catalytic Processes*, McGraw-Hill, Inc. (1979) and Pines, H., *The Chemistry of Catalytic Hydrocarbon Conversions*, Academic Press (1981).

SUMMARY OF THE INVENTION

The principal aim of the invention is the elimination of environmental impact problems, recovery of heat energy and minimal production of screening reject. This aim is achieved by a process and an apparatus organized according to the pyrolysis (cracking) process, of the present invention.

BRIEF DESCRIPTION OF THE DRAWINGS

Further characteristics and advantages will become apparent from the description of a preferred embodiment of the process and apparatus for the controlled pyrolysis of plastic materials, illustrated only by way of non-limitative example in the accompanying drawing figures, wherein.

DESCRIPTION OF THE PREFERRED EMBODIMENTS

Figure 1:
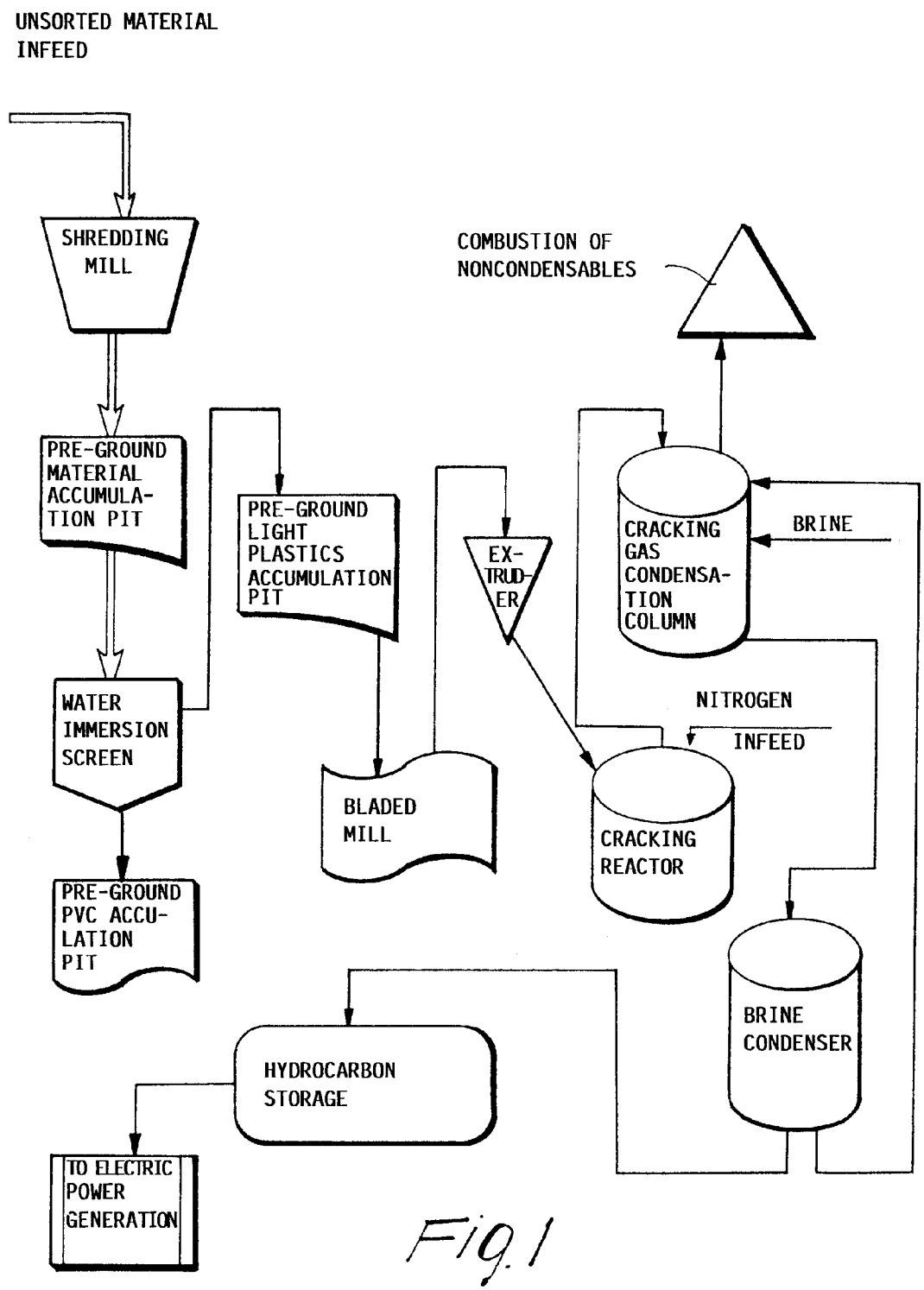
FIG. 1 is a flowchart of a cracking process for producing hydrocarbons from PVC-free plastic with indicated the main parts of a system for carrying out the process of the invention.

In its broadest aspect, the present invention relates to a process and an apparatus for cracking a polymeric material which comprises a reactor containing a molten catalyst bed and means for introducing said polymeric material in said catalyst bed.

As will become apparent from the following detailed description of the invention, the catalyst used is typically a metal or a mixture of metals and optionally contains an acid component.

The process according to the invention is useful for converting a variety of polymers, side-chain plastics, linear-chain plastics and halogenated plastics, such as for example PVC, into hydrocarbon products which are useful for energy production yet avoid the pollution problems associated with the direct combustion of plastic materials. The process according to the invention can also be used for cracking mixtures of polymeric materials derived from the sorting of municipal solid waste.

In the pyrolysis of organic components with a high relative molecular mass, such as plastics, it can be specified that the treatment is a combination of two technologies, namely thermal cracking and catalytic cracking.

According to the present invention, the materials that can be subjected to cracking are differentiated into (1) side-chain plastics (methyl methacrylate, polyurethanes, furan resins), in which it is possible to reobtain the initial monomer to restore new polymers; (2) linear plastics (PVC, PET, PP), alone or mixed, from which hydrocarbons are obtained which are meant for combustion to produce electric power; and (3) a mixture of plastics derived from the mechanized sorting of municipal solid waste, constituted by a highly differentiated mixture of products ranging from plastics to rubber to paper etcetera.

When dealing with a system for cracking non-uniform plastic (a mixture of various types of plastic), the result is not just aliphatic hydrocarbons but a mixture of hydrocarbons. When dealing with pure plastics (of a single type), it is not convenient to use them for the production of hydrocarbons; rather, it is convenient to act so as to obtain new monomers or directly reuse the plastics.

The hydrocarbons that can be obtained from a pyrolysis (cracking) process; must have the following characteristics: (1) high content of products having a low relative molecular mass, which must bum without excessive carbon-containing residues; (2) absolute absence of halogens and acid-derived products; and (3) low content of unsaturated compounds, in order to avoid condensations during storage.

This aim, this object and others which will become apparent hereinafter are achieved by an apparatus which comprises a reactor which contains a bed of catalyst in the molten state.

The catalytic cracking of plastic polymers can be considered as a. macromolecular lysis into free radicals, whose composition depends on the following factors: (1) the type of catalyst used in the process; (2) the temperature and time of contact with the catalyst; and (3) the amount of plastic material involved per unit time and with respect to the volume of the catalyst.

The characteristics that catalysts must have are an electronegative power capable of breaking down a polymeric compound into smaller molecular fractions; their validity has been determined experimentally and the most valid catalysts are described hereinafter.

The addition of an acid-acting component, such as a silicate or a carbonate, is always determined experimentally; usually, silicate or another compound is added when cracking processes occur with the formation of noncondensable gases, i.e., when the catalyst acts so quickly that it breaks the polymer down into gaseous units which cannot condense at conventional temperatures ($H_2$, $CH_3^+$, $CH_4$, etcetera).

The optimum temperature of the catalyst was calculated by thermodynamic analysis combined with an infrared spectrum, analyzing the peaks in the infrared spectrum of the products of the gasification of the plastics with time and temperature as variants.

Typically, the catalyst has a melting point of 430° C. or less, preferably 400° C. or less. In the process, the catalyst is kept at a temperature of 460–550° C., preferably 480–530° C. The temperature of the catalyst in the reactor is typically at least 60° C. above its melting point, preferably at least 70° C. above its melting point.

As clearly shown by the examples, the catalyst is typically a metal or a mixture of metals. Preferably, said catalyst is chosen from the group that consists of lead, tin, zinc, antimony and mixtures thereof, optionally together with other metals. Examples of metals and mixtures of metals that can be used in the process according to the invention are lead, a lead-zinc mixture, a lead-tin mixture, a zinc-tin mixture, a lead-zinc-tin mixture, a zinc-antimony mixture, or a lead-copper mixture.

In an example of a useful catalyst mixture which comprises lead and zinc., the zinc is present in the amount of 15–25% by weight, preferably approximately 20% by weight. In an example of a useful catalyst mixture comprising lead and tin, tin is present in the amount of 5–15% by weight, preferably approximately 10% by weight.

The molten catalyst can also advantageously contain an acid component. Examples of an acid component are metallic silicates, metallic carbonates and mixtures thereof. More particularly, the acid component can be aluminium silicate or lead carbonate. In this regard, tin, antimony and zinc silicates are effective, although they showed lower yields in initial tests. It should be observed that the above mentioned salts are present in the reactor in the molten state rather than as a heterogeneous mixture.

Usually, the catalyst bed is agitated continuously; agitation is meant to homogenize the temperatures and maintain intimate contact between the catalysts and the reaction products. The material to be cracked is introduced in the fluid bed at a depth of generally 2–15 cm. Excellent results were observed when the materials was introduced at a depth of 4–5 cm. The depth depends on the polymer to be treated and on the preset temperature and contact times.

Experience acquired in pilot plants has shown that the amount of plastic material, in kilograms, converted per liter of catalyst per unit time (24 hours) reached values between 12 and 15. The process can obviously be optimized and better yields are certainly within the grasp of the skilled in the art.

Although there is to intention of being limited by theory, the reactions that can be hypothesized are as follows:

(1) in the first stage (immersion of the polymers in the molten bed of the catalyst), the polymer breaks down in the C—C bonds and the resulting radicals are fixed to the catalyst; during this step, a series of electrons is released, consequently forming aliphatic compounds.

(2) during the first-step reaction, the catalyst assumes acid characteristics; the aliphatic components migrate onto this surface, assume one proton and are converted into carbocations.

(3) the carbocation can undergo a plurality of different reactions: it can break down into two fragments, isomerize and produce a form with more side chains, or undergo various cyclizations; in the end, in any case, it loses one proton, restores the activity of the catalyst and migrates to the surface as a gas.

By appropriately varying the temperatures of the catalyst, the contact times and the charges of plastic material in the unit time it is possible to obtain semipolymers together with the hydrocarbons. The semipolymers can be collected in a fraction which condenses at 70+/−5° C., while the hydrocarbons are collected in another fraction which condenses at 9+/−2° C.

Separation can be performed by using a particular plate condenser in which the central part of the plates is heated, over approximately ⅓ of the total surface of said plate, to a temperature of 70+/−5° C. and the peripheral part (⅔ of the total surface of said plate) is cooled with water cooled to 5+/−1° C.

The fraction that condenses at 70° C. represents the fraction designated earlier as a semipolymer, which contains a mixture of products of the cyclization of the aliphatic compounds. The fraction that condenses at 8° C. contains short-chain aliphatic products. Gas chromatography analyses for the first fraction in fact indicate a mixture of hydrocarbon semipolymers containing 70–120 carbon atoms and, for the second fraction, a mixture of short-chain compounds containing 5–25 carbon atoms.

The semipolymers can be used in mixtures with paper and rags separated out from municipal solid waste. This possibility allows to provide a mixture with paper and rags which allows to improve the combustion efficiencies of said mixture; bearing in mind that the dry fraction produced by the screening of municipal solid waste, generally composed of 45–50% plastics and 45–50% paper and rags, has an average composition of 45–50% plastics and 45–50% paper and rags, if the paper and rags mixture were used directly as a solid fuel, one could utilize a heating value of 2000–2500 kcal/kg and one would obtain a volume of combustion ash equal to 26–30% of the burnt fraction.

The addition of 50% of the semipolymers obtained from the cracking process would raise the heating value of the paper-rags mixture to 5500–6000 kcal/kg; since these semipolymers, by way of their chemical configuration, are oxygen carriers, one would obtain a decrease in ash from 26–30% to a maximum of 4%.

On the basis of these experimental data, it has been thought to hypothetically outline the electric power generation stations which would operate with waste plastic material. The hydrocarbons (liquid phase of the cracking process), which are preferably largely aliphatic, are sent to an electric generator (gas-turbine) whose delivered power rating is 60% of the required power; the hot fumes of combustion are used as a cogeneration factor to heat water. The heat exchange process occurs in a boiler which is controlled by a feeder system for the combustion of solid fuels, i.e., the mixture of paper, rags and semipolymers, so that the water is brought to the temperature of 480° C. and the vapors are used for a high-pressure turbine.

Since high-pressure turbines have limited elasticity in terms of the possibility of variations with respect to the potential of delivered energy, it is possible to utilize the variation in energy with the gas-turbine units; accordingly, when it is necessary to reduce energy consumption (nighttime or plant shutdowns) it is possible to resort to gas-turbine units and have steam available for other industrial uses.

Figure 2:
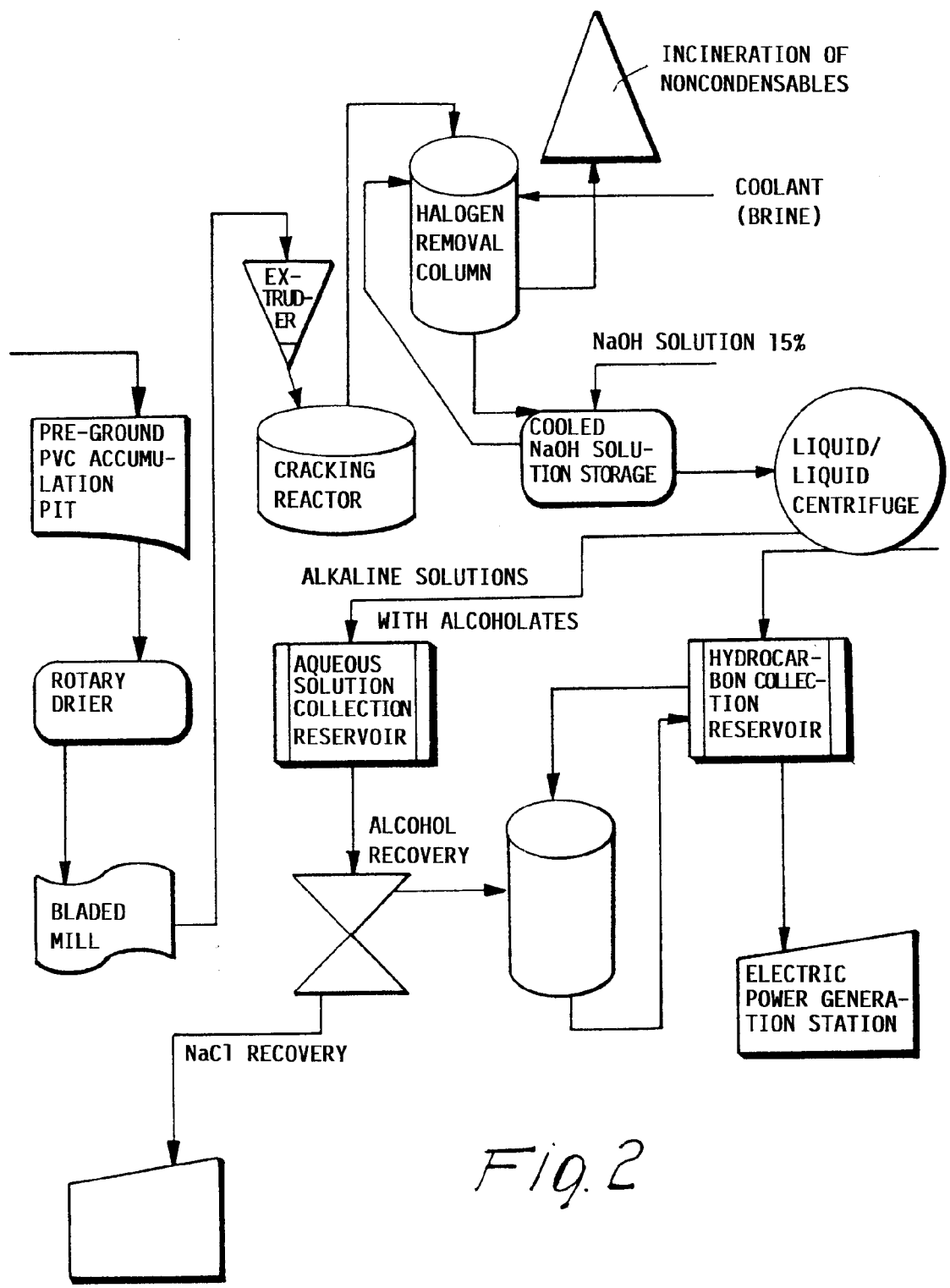
FIG. 2 is a flowchart of a cracking process for producing hydrocarbons from PVC and halogenated plastic.
Figure 3:
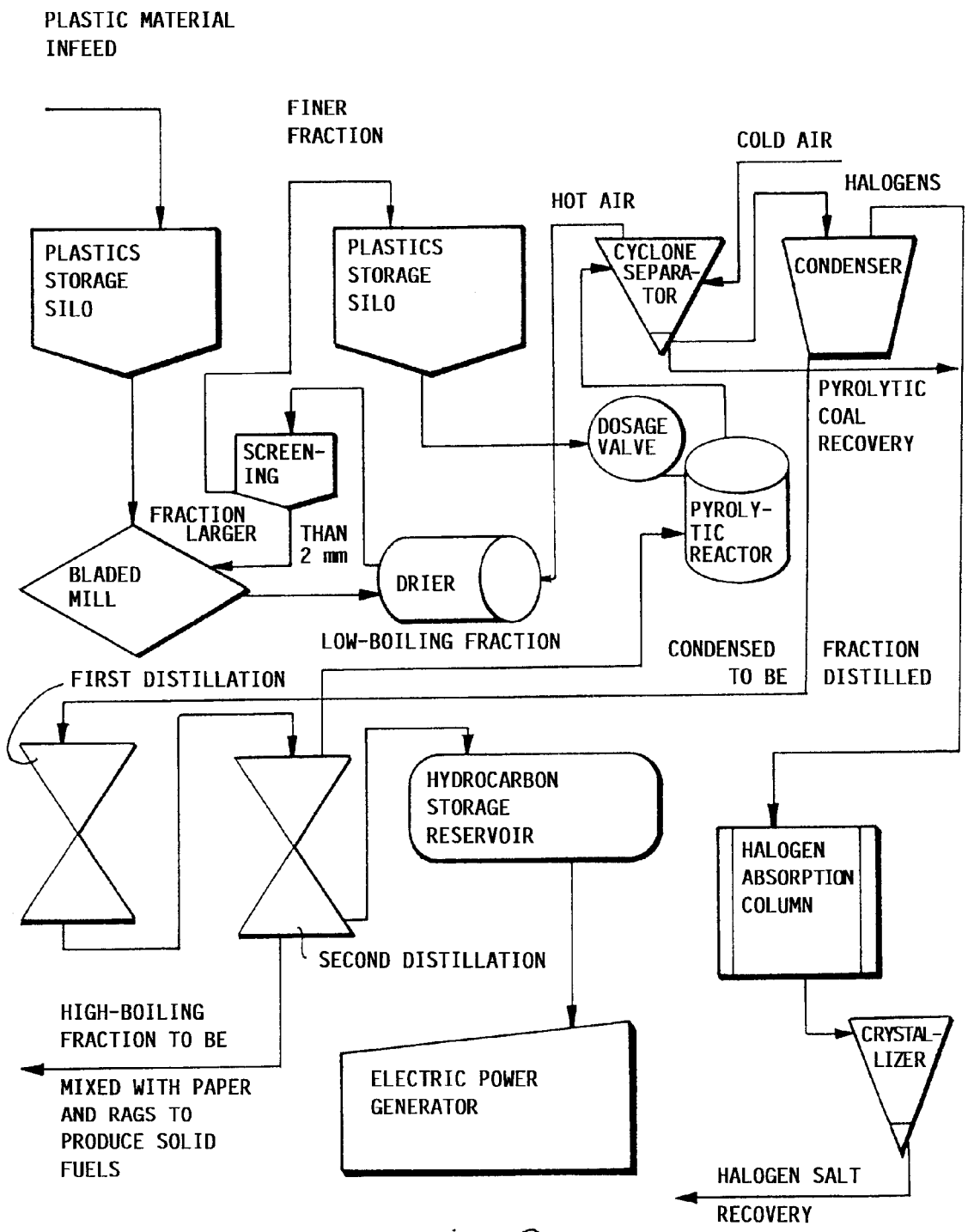
FIG. 3 is a flowchart of a cracking process for producing hydrocarbons from linear plastics.

The cracking processes according to the invention are illustrated in the flowcharts of FIGS. 1–3.

Depending on the differentiation and heterogeneous nature of the plastic materials derived from the sorting of municipal solid waste and from plastics in general, the cracking process is performed after careful thermodynamic-infrared analysis on the mixture to be cracked.

Thermodynamic analysis combined with an infrared spectrum is a type of analysis which is well-known to analysts in the field; it consists in analyzing the gasification of an organic substance by means of an infrared spectrum after the substance has been subjected to a rapid change in temperature over a specific time fraction. The tests allow to determine the rate at which the material is fed into the catalyst bed and the amount thereof as a function of the difference of the plastic material used.

In order to perform the cracking process, two containment silos are prepared: one is active while the other one is subjected to analysis. The silos have a capacity adapted for 24 hours of operation and the material is suitably ground and homogenized, as will become apparent from the following description.

With reference to the flowchart shown in FIG. 1, cracking is performed as follows:

During the pretreatment step, grinding is performed in two separate steps, divided between a coarse grinding and a final grinding. Coarse grinding is performed by a shredding mill, capable of reducing the material to fragments measuring no more than 12 mm, preferably no more than 10 mm, while final grinding is performed by means of a bladed mill capable of reducing the fragments to dimensions of no more than 3 mm, preferably no more than 2 mm.

Between the first and the second grinding, the material undergoes immersion screening and drying as described hereinafter. During coarse grinding, the sorted material arriving from the accumulation pit is subjected to grinding by means of a shredding mill whose grilles are organized so as to allow a fragment size of no more than 12 mm, preferably no more than 10 mm. In the immersion screening, the material subjected to coarse grinding is sent to a vibrating water-immersion screen. By utilizing the difference in relative density between halogenated plastics and other plastics, a distinct separation is achieved and the halogenated plastics are collected at the bottom of the screen, while the lighter ones are entrained by the motion of the water and are recovered on the upper part of the screen. The screened material is dried with hot air by means of a cyclone or rotary drier (not shown in FIG. 1), depending on the amount of plastics involved. In order to achieve fine grinding, the dried material is sent to grinding by means of a bladed mill, whose grilles must be organized so as to achieve a fragment size of no more than 3 mm, preferably no more than 2 mm.

The material thus prepared is stored in fiber-reinforced plastic silos (not shown in FIG. 1), whose capacity must be at least equal to 24 hours of processing; for this purpose, at least three containment silos for the mixture to be cracked are prepared, so as to always have the possibility to preset the temperatures and times of the reaction as described hereafter.

During cracking, dosage of the material is determined by a thermodynamics/infrared analysis which determines, as a function of the contact time/operating temperature, the amount to be introduced in the reactor in the unit time. This is an extremely important value, since it allows to obtain high yields without producing large amounts of pyrolytic coal; moreover, the analysis identifies the amounts of the simpler carbon/hydrogen products which have the highest heating value.

Thermodynamic analysis is performed on a mixture of samples taken during the fine grinding step and sample collection ports arranged on the conveyor belt that feeds the storage silo are used.

Cracking follows a preheating step, during which the dried material is removed by way of a screw-feeder extractor and sent to an extruder which is directly connected to the cracking reactor (each reactor has extruders which operate with a very specific synchronization which depends on the above mentioned analysis); the extruders are fed by way of a screw feeder/piston valve which is meant to provide precise dosage of the amount of product to be introduced in the reactor. The extruders, constituting practically feeding means for introducing the material into the apparatus of the present invention, bring the material to a plastic state, which allows to inject it into the reactor without difficulty. The temperature increase allows to reduce contact times, improving the quality of the obtainable aliphatic hydrocarbons.

Cracking occurs in a stainless steel reactor, for example of the 18/8/2 type, which must be kept at a temperature which avoids unwanted condensation under the ceiling of the reactor (i.e., in the part that is not occupied by the catalyst; approximately ⅓ of the volume of the reactor). The temperature of the reactor is maintained by forced circulation of diathermic oil or with other heating sources but avoiding the use of flame heating in order to avoid fire hazards. As regards the temperature of the free ceiling of the reactor, it is usually kept at 320–430° C.

The reactor is filled for ⅔ of its volume with a catalyst maintained in the molten state for example by forced circulation of diathermic oil heated in a suitable central unit.

The plastic material is injected into the bed of the catalyst and the extruded plastic material, on contact with the catalyst, gasifies in a few seconds; the cracking gases are collected by suction (the entire system operates with a slight negative pressure) by a cyclone (not shown in FIG. 1) which is meant to separate the traces of metals distilled from the cracking gas; these metals are recovered from the bottom of the cyclone and sent to reuse.

The gases, separated from the metallic parts, undergo two separate condensation processes which depend on the type of plastic being cracked.

As regards plastics with halogens (see FIG. 2), in a first step the gases that arrive from the cracking reactor are scrubbed in a square tower by circulating a solution of 15% NaOH by weight. The top part of the column is cooled by a coil in which brine at a temperature of −15° C. is subjected to forced circulation. The eluate, which contains the salified halogens, all the water-soluble products (methyl alcohol, amyl alcohol, formaldehyde, etcetera) and the insoluble hydrocarbons, is connected in an accumulation reservoir, agitated and kept cool by the brine.

During a second step, the eluates are sent to a liquid/liquid centrifuge of the ALFA LAVAL class or the like. Centrifugation separates the aqueous fraction from the fraction composed of (mostly aliphatic) hydrocarbons obtained from cracking. The hydrocarbons are collected in a steel accumulation reservoir equipped with a cooling and agitation system to be used as fuel to generate electric power. The aqueous part undergoes fractional distillation process in order to separate the halogenated salts from the combustible products. The combustible products collected at the top of the distillation column (a perforated-plate column is used) are sent to the hydrocarbon collection reservoir after passing through a tube-nest condenser.

In the case of halogen-free plastics (see FIG. 1), the gases that arrive from the cracking reactor are transferred directly to the condensation column and are therefore condensed with the cracking hydrocarbons, which are kept cool by means of a brine heat exchanger and stored in an agitated and cooled reservoir.

The entire system must operate with a slight negative pressure (10–15 mm of water head), from the extruders to the condensation column. The apparatus must be saturated with nitrogen and at the bottom of the condensation column there must be a collection system for the nitrogen which, before being released into the environment, must be burned in order to eliminate the traces of noncondensables that inevitably form during the process.

With reference to FIG. 3, the plastic material, which is generally collected after separating municipal solid waste and is therefore a mixture of plastics, is stored in a silo having a capacity equal to 24 hours of operation. The material undergoes a first grinding by way of a bladed mill and then a screening in order to separate out fragments measuring more than 2 mm. The fraction larger than 2 mm is returned to grinding. The smaller fraction (2 mm) is stored in a silo having the same capacity as the first one (24 hours). The final storage operation is preceded by drying performed with hot air obtained during the cooling of the separator cyclone, whose task is to separate the cracking coal entrained by the cracking gases. The amount of plastic material reserved for the cracking process is removed from the silo that stores the fine fraction (2 mm) by means of a dosage valve or volumetric valve; said amount is always determined by means of the above described thermodynamic-infrared analysis. The gases produced in the cracking process are sent to the cyclone in order to separate out the produced coals and are then transferred to a water-cooled condenser. Two products form in this condenser: a noncondensable gas and a liquid constituted by a highly heterogeneous mixture of hydrocarbons. The noncondensables are sent to a column for absorption in countercurrent with a 15% alkaline solution of NaOH; said column retains said halogens by chemical reaction between the halogens and the NaOH, forming the respective salts, which are recovered by crystallization. The hydrocarbons undergo fractional distillation, which yields three different types of product, specifically: (1) a low-boiling fraction, constituted by a mixture of alcohols and hydrocarbons with low relative molecular mass ($C_3$–$C_8$), which are used to maintain reactor heating; (2) a medium fraction ($C_5$–$C_{25}$), which is stored for use in the gas-turbine generators; and (3) a high-boiling fraction (semipolymers) which is used as an additive for the paper and rags, exactly as described above.

Although the reactions for the formation of the hydrocarbons and of the small molecules can be hypothesized only after careful analysis of the resulting products, it can be said that the noncondensable gases are as follows:

$H_2S$; $CH_4$; $N_2$; $NH_3$; HCl; HF; traces of $CO_2$ and, by entrainment, $C_2H_5OH$ and low-boiling components which can be fully blocked if rapid cooling with low temperatures (5–7° C.) is performed.

The above listed gases must therefore first undergo absorption in a removal tower in an alkaline environment (caustic soda or caustic potash). The $H_2S$, $NH_3$, HCl, HF and $CO_2$ gases are converted into $Na_2S$, $NH_4OH$, NaCl, NaF and $Na_2CO_3$, respectively.

The other components, i.e., $CH_4$, $C_2H_5OH$ and the entrainment products, are transferred to a torch because they are flammable and are converted into $CO_2$ and $H_2O$.

On the basis of the experience acquired in pilot plants, the catalysts that are particularly suitable for cracking plastic materials are listed in the following table. In examples 1–6, the percentage composition of the metallic catalysts and the percentage composition of the plastic materials are expressed by weight.

The disclosures in Italian Patent Application No. MI98A000581 from which this application claims priority are incorporated herein by reference.

| Ex. | Catalyst type | Plastic material | Catalyst temperature (° C.) | Plastic material quantity (Kg)/ time unit (24 h) | Catalyst volume (l) |
|---|---|---|---|---|---|
| 1 | Lead | MTAM, polyphenols[1] | 480 | 190–200 | 15 |
| 2 | Lead | PE[2] | 500 | 190–200 | 15 |
| 3 | Lead 80%-Zinc 20% | PET[3] | 490 | 190–200 | 15 |
| 4 | Lead 90%-Tin 10% | PP[4] | 490 | 200–220 | 15 |
| 5 | Lead 70%-Zinc 20%-Tin 10% | MTAM 30% PE 35% PP 20% PET 15% | 500 | 220 | 15 |
| 6 | Lead 80%-Zinc 20% | RDF[5] | 530 | 220 | 15 |

[1]Methyl methacrylate and polyphenol resins
[2]Low-density polyethylene
[3]Polyethylene terephthalate
[4]Polypropylene
[5]Mixture of plastic materials derived from the dry fraction of the screening of municipal solid waste, generally composed of 45–50% plastic and 45–50% paper and rags.

What is claimed is:

1. A process for converting waste polymeric materials into products useful for energy production, comprising the steps of:
    a. bringing the polymeric material into a plastic state;
    b. immersing the polymeric material in plastic state in a molten metal bed at a depth of 2–15 cm, said bed being agitated continuously, thereby obtaining gaseous products which migrate in a gas space above the bed, said gas space being maintained at a temperature of 320–430° C.;
    c. collecting the gaseous products by suction from the gas space.

2. The process according to claim 1 further comprising
    d. subjecting the collected gaseous products to condensation and collecting a semipolymer fraction which condenses at 70+/−5° C.

3. The process according to claim 2 further comprising
    e. collecting condensed hydrocarbon products condensing at 9+/−2° C.

4. The process according to claim 1 wherein the molten metal bed comprises an element selected from the group consisting of lead, tin, zinc, antimony and mixtures thereof.

5. The process according to claim 1 wherein the molten metal bed is kept at a temperature of 460–550° C.

6. The process according to claim 1 wherein the molten metal bed is kept at a temperature at least 60° C. above its melting point.

7. The process according to claim 1 wherein the molten metal bed comprises acidic components.

8. The process according to claim 7 wherein the acidic components are selected from the group consisting of metal silicates, metal carbonates and mixtures thereof.

9. A process for converting waste polymeric material comprising halogenated plastics into products useful for energy production, comprising the steps of:
   a. grinding the polymeric material,
   b. subjecting the grounded polymeric material to immersion screening thereby separating a heavy fraction containing halogenated plastics and a light fraction of remaining polymeric material,
   c. collecting separately the heavy fraction and the light fraction,
   d. bringing the heavy fraction into a plastic state;
   f. immersing the heavy fraction in plastic state, in a first bed of molten metal at a depth of 2–15 cm, thereby obtaining gaseous products which migrate in a gas space above the first bed,
   g. collecting the gaseous products by suction from the gas space above the first bed;
   h. scrubbing the gas products from phase g thereby obtaining an eluate containing a water fraction including halogenated products and an insoluble hydrocarbon fraction.

10. The process according to claim 9 further including
   i. subjecting the eluate from phase h to liquid/liquid centrifugation thereby separating the insoluble hydrocarbon fraction from the water soluble fraction.

11. The process according to claim 10 further comprising
   j. subjecting to fractional distilation the water soluble fraction thereby separating the halogenated products.

12. The process of claim 9 further comprising the steps of:
   k. bringing the light fraction into a plastic state;
   l. immersing each of the light fraction in plastic state, in a second bed of molten metal at a depth of 2–15 cm, thereby obtaining gaseous products which migrate in a gas space above the second bed,
   m. collecting the gaseous products by suction from the gas space above the second bed;
   n. subjecting to condensation the collected gaseous products thereby separating hydrocarbon products.

13. The process according to claim 9 wherein the gas space above the first bed is kept at a temperature of 320–430° C.

14. The process according to claim 9 wherein the molten metal bed comprises an element selected from the group consisting of lead, tin, zinc, antimony and mixtures thereof.

15. The process according to claim 9 wherein the molten metal bed is kept at a temperature of 460–550° C.

16. The process according to claim 9 wherein the molten metal bed is kept at a temperature at least 60° C. above the its melting point.

17. The process according to claim 9 wherein the molten metal bed comprises acidic components.

18. The process according to claim 17 wherein the acidic components are selected from the group consisting of metal silicates, metal carbonates and mixtures thereof.

19. An apparatus for converting waste polymeric material into products useful for the energy production, comprising:
   a reactor containing a molten metal bed and a space above the molten metal bed;
   means for feeding the polymeric material in plastic state into the molten metal bed at a depth of 2–15 cm under the top surface of the molten metal bed;
   a condensation column connected to the space above the molten metal bed of the reactor;
   collecting means connected to the condensation column.

20. The apparatus according to claim 19 wherein the reactor further comprises an agitation system for the molten metal bed.

21. The apparatus according to claim 20 wherein the molten metal bed comprises a metal selected from lead, tin, zinc, antimony and mixtures thereof.

22. The process according to claim 20 wherein the molten metal bed comprises an acidic component selected from the group consisting of metal silicates, metal carbonates and mixtures thereof.

* * * * *